United States Patent [19]

Gruber

[11] Patent Number: 4,614,529

[45] Date of Patent: Sep. 30, 1986

[54] GLASS YARN FILTER FOR GAS REGULATORS

[75] Inventor: Arthur W. Gruber, Virginia Beach, Va.

[73] Assignee: The BOC Group, Inc., Montvale, N.J.

[21] Appl. No.: 426,315

[22] Filed: Sep. 29, 1982

[51] Int. Cl.[4] ............................................. B01D 37/00
[52] U.S. Cl. ....................................... 55/520; 55/527; 210/497.01
[58] Field of Search ................... 210/495, 497.01, 496, 210/499, 151; 55/528, 527, 520; 137/550

[56] References Cited

U.S. PATENT DOCUMENTS

| | | | |
|---|---|---|---|
| 1,679,826 | 8/1928 | Jenkins | 137/550 X |
| 1,941,928 | 1/1934 | Bradford, Jr. | 55/520 X |
| 2,383,672 | 8/1945 | Neisingh | 210/497.1 X |
| 2,551,175 | 5/1951 | Smith | 210/204 |
| 3,198,335 | 8/1965 | Lewis et al. | 210/495 X |
| 3,398,837 | 8/1968 | Adams | 210/497.1 X |
| 3,563,889 | 2/1971 | Cooper, IV et al. | 210/23 |
| 4,498,985 | 2/1985 | Atkinson et al. | 210/151 |

FOREIGN PATENT DOCUMENTS

| | | | |
|---|---|---|---|
| 271156 | 3/1914 | Fed. Rep. of Germany | 210/499 |
| 2753276 | 5/1979 | Fed. Rep. of Germany | 55/520 |
| 0099315 | 7/1980 | Japan | 55/528 |

Primary Examiner—Frank Spear
Attorney, Agent, or Firm—Roger M. Rathbun; Larry R. Cassett; David A. Draegert

[57] ABSTRACT

A filter for removing particulate matter from a fluid stream, particularly from gas flowing through a pressure regulating valve. The preferred embodiment is a regular geometric pattern, such as a toroid, formed from a length of yarn. Preferably the yarn comprises continuous filaments of glass which are twisted together. When placed in a fluid line, such a filter has a large capacity for trapping and retaining small particles which disperse throughout the filter.

8 Claims, 4 Drawing Figures

GLASS YARN FILTER FOR GAS REGULATORS

FIELD OF THE INVENTION

The invention relates to a filter for removing particulate matter from a fluid stream, especially from gas flowing through a pressure regulating valve.

BACKGROUND ART

It is frequently desirable to remove particulate matter from flowing streams to reduce contamination of downstream processes and equipment. In the gas-shielded arc welding field, welding spatter is a particularly acute problem because of the regular spherical shapes and the small size, typically 10 $\mu$m diameter, of the particles. These particles must be removed from the gas flowing through a regulating valve because they may deposit on valve seats and reduce the accuracy and reliability of the regulator mechanism. Several types of filters have been used in gas regulators. Among these filters are wire mesh screens which must be made of very small diameter wire since spherical particles having a diameter less than about one-quarter of the diameter of the wire can pass through a closely woven wire mesh. Smaller particles can be trapped if the woven wire is mechanically flattened or compacted to decrease the space between the wires. Unfortunately, such compacting also reduces the area open for gas flow and increases the pressure drop across the filter. Further, trapped particles tend to build up at the sharply defined surface of the screen, and the resulting clogging further increases the pressure drop required to maintain a desired gas flow rate. Natural and synthetic fiber fabrics have also been used as filters. Further, clumps of natural, synthetic, or metal fibers, e.g., steel wool, have been used as filters in gas regulators. These types of filters have randomly shaped openings between the fibers and provide relatively poor filtration for small particles. The performance of a sintered metal filter suffers from the same problem for a similar reason.

Fiber glass has also been used as a material for regulator filters. This material has special properties which make it a preferred material for such applications. More particularly fiber glass is non-flammable, non-hydroscopic, chemically inert, non-toxic, durable, inexpensive, readily available, and very effective. Two types of fiber glass filters are known: (1) A clump of short fibers formed into a wad and stuffed into a cavity. Typically, the length and diameter of the loose roving was 50 to 100% greater than the diameter of the cavity; (2) A disc cut from a fiber glass blanket in which the fibers are randomly oriented in layers with a thin layer of sizing applied to the surface layers to assist in retaining disc shape during cutting and handling. The diameter of the cut disc was approximately the diameter of the filter cavity.

Both of these previous fiber glass filters suffered from the disadvantage that the filter comprised relatively short lengths of glass fiber and thus included a very large number of cut ends. Such ends are easily broken and create a nuisance and possible hazard during fabrication. In addition, experience with the blanket type filters revealed that they would greatly compress and expand as the flow rate of the gas increased and decreased. For example, tests with a fiber glass blanket filter having an initial thickness of 0.5 inches revealed that it compressed to approximately 0.035 inches thickness under typical flow conditions, and then expanded back to about 0.25 inches when the flow stopped. The resulting mechanical movement breaks the cut ends of the glass fibers and the pieces become contaminants to be trapped. In extreme situations the movements can cause the filter to dislodge the metal screens or other structure which supports the filter in the fluid line.

SUMMARY OF THE INVENTION

The preferred filter of the present invention is a regular geometric pattern formed from a long length of yarn. The preferred yarn comprises many continuous filaments of small diameter glass which are spum or twisted together. Preferably, the fiber glass yarn is texturized to impart greater bulk and thickness to the yarn. Many grades and types of texturized glass yarn are commercially available and most of those evaluated would produce a useful filter.

In the preferred embodiment the yarn is first formed into a helical coil having many closely spaced but not overlapping turns. Next, the coil is formed into a toroid shaped structure and tied so that the opening at the center of the toroid is closed, i.e., the inner diameter of the toroid is very small. The toroid structure is placed into a cavity with the plane of the toroid approximately perpendicular to the gas flow. The toroid structure is retained in position by a wire screen or other support structure which extends across the cavity downstream, and preferably upstream, from the filter. Other shapes are possible, but the toroid shape is preferred because of ease in fabricating and handling.

The glass yarn filter posseses many important advantages. The filter is a uniform structure having openings between many generally parallel but closely spaced filaments capable of trapping very small particles with minimum pressure drop. The filter is easily sized to make close contact with the cavity walls. The filter has a large capacity for retaining particles because they disperse throughout the structure. Glass fiber contamination of the gas stream is minimized because (1) there are relatively few cut ends since long fibers are used, (2) the structure is resilient and the fibers are generally parallel to the cavity walls at the edges of the filter, and (3) there is minimal movement of the filter when the fluid flowrate is changed.

DESCRIPTION OF THE PREFERRED EMBODIMENT

The preferred filter is constructed from a length of texturized fiber glass yarn which is uniform and pliable so as to be easily formed into the desired shape. In particular, the yarn has approximately twelve thousand filaments of approximately $1.75 \times 10^{-4}$ in. diameter which are twisted into a yarn of approximately 3/32 in. diameter. Such a multistrand texturized product, designated ETC 11.8 with OS-1 finish, is commercially available from PPG Industries, Pittsburgh, Pennsylvania. The 11.8 designates that there are approximately 1180 yards of bare glass per pound of strand. The OS-1 designates a 3.5% total starch oil sizing and overspray, which protects the filaments during fabrication. The outside diameter of the completed filter is preferably between 1.5 and 2 times the diameter of the cavity into which it will be placed. The outer diameter of the toroid is approximately twice the diameter of the helical coil. For a cylindrical cavity of 0.44 in. diameter and 0.31 in. length, a coil inner diameter of 0.25 in. is adequate. Such a filter preferably has about 27 turns and requires approximately 24 in. of yarn to make.

Figure 1:
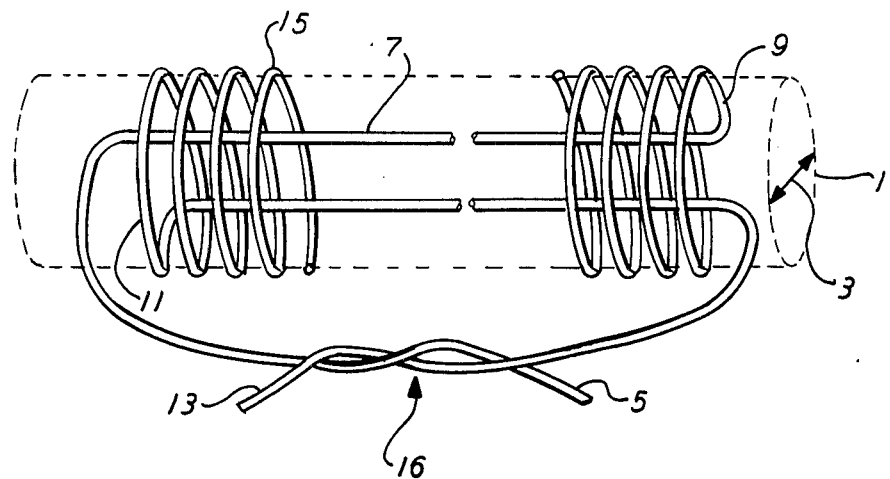
FIG. 1 is a perspective drawing illustrating the structure of a yarn filter before tightening of the knot.
Figure 2:
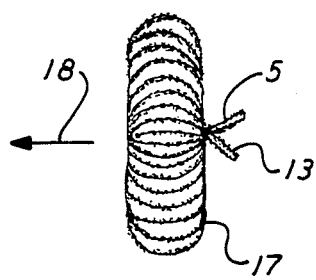
FIG. 2 is a side view of a filter looking normal to the direction of flow.
Figure 3:
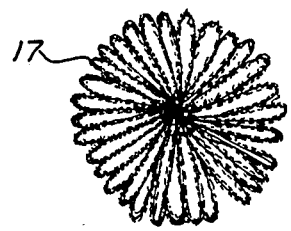
FIG. 3 is an end view of a filter looking into the direction of flow.
Figure 4:
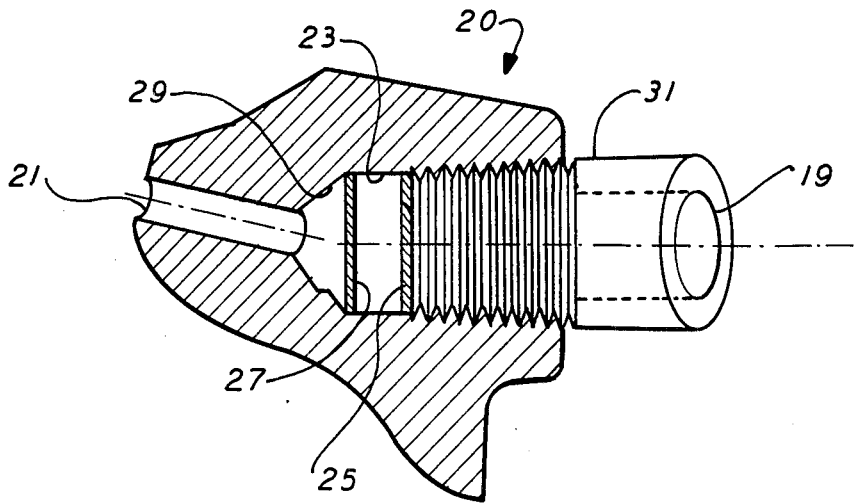
FIG. 4 is a side view partially in cross section, of a cavity in which a glass yarn filter is located.

A preferred method for making a yarn filter is illustrated in FIG. 1. The filter is advantageously wound around a cylindrical form (shown in dashed outline) of diameter 3. First, an initial length of yarn near one end 5 is laid along the form and the desired number of turns are wound starting from end 9 and winding back around the form and the initial length of yarn to end 11. The free end 13 of the yarn is then passed forward through the inside of the coil from end 11 to end 9. Thus, one end of the yarn emerges from each end of a helical coil, as shown in FIG. 1. The form is removed and the two ends drawn together so that the helical coil becomes a toroid shaped structure 17. Preferably, the yarn ends are drawn tight so that the central hole in the plane of the toroid is closed, as indicated in FIG. 3. The free ends of the yarn are tied with a single overhand knot 16 or otherwise secured and the free ends 5, 13 of the yarn are cut so that they are no longer than the radius of the toroid. Next, the filter is placed inside a cavity in a fluid line, preferably with the free ends of the yarn 5 and 13 toward the upstream end as shown in FIG. 2, where the direction of gas flow is indicated by an arrow 18. As shown in FIG. 4, the fluid line has an entrance opening 19 and an exit opening 21. The filter is held in place in the cavity 23 by suitable structure such as first and second wire mesh screens, 25, 27, supported in any suitable manner, such as by a restricted aperture 29 at one end, and a threaded plug 31 at the other. Since the function of the wire screens is only to hold the yarn filter in place, the mesh need not be fine enough to trap small particles. If there is no danger of back pressure, the upstream screen may be omitted. Because the diameter of the toroid structure is larger than the diameter of the cavity, the yarn filter must be stuffed into the cavity. The resiliency of the filter prevents fluid from bypassing around the edges of the filter because close contact with the side walls of the cavity is maintained.

The structure of the glass yarn filter is such that it can trap very small particles, but yet is so porous that there is only a small pressure drop in gas flowing through the filter. The structure allows particulate matter to enter it to a considerable depth and become trapped in the myriad of small gaps between individual fibers. This dispersion of trapped material enables this filter to absorb a large amount of particulate matter with very little increase in pressure drop.

The dispersive entrapment of the glass yarn filter is readiy demonstrated by placing the filter in a transparent cavity and introducing finely divided graphite powder into the gas stream entering the filter. The graphite penetrates into the filter, but without passing through it. The compacted wire mesh filters and sintered metal filters which were tested did not retain more than a trace of the powdered graphite; most of the particles passed completely through these conventional filters.

Although the glass yarn filter is resilient there is minimal expansion and contraction of the filter as the gas pressure is changed. Indeed a glass yarn filter remained in position and was apparently unaffected by testing in which a pressure of 2200 pounds per square inch was applied and released 50,000 times.

The diameter and number of coils of yarn, can easily be changed so as to allow fabrication of filters in a wide variety of sizes. In certain critical applications, more than one yarn filter may be placed in line in a single cavity. For large cavities, several partially overlapping filters may be placed between two screens which span the cavity. Further, a donut-shaped filter suitable for placing in a cavity between concentric pipes can easily be fabricated by pulling the toroidal structure tight around the inside pipe. Fiber glass yarn is the preferred material for making filters for gas regulator applications, but the procedure for making the yarn filter is also applicbale to yarns of wool, cotton, polyester, Teflon TM polymer or even metal fibers.

Numerous other embodiments and variations of the invention may be conceived from the teachings of this specification. The scope of the present invention is defined by the following claims:

What is claimed is:

1. A method of making a yarn filter for a fluid line comprising winding a yarn composed of continuous filaments into a helical coil, securing the ends of the yarn so that the coil is transformed into a toroid which can be placed in a fluid line.

2. The method of claim 1 wherein the yarn is fiber glass, and the toroid has a closed center.

3. A trap for removing particulate matter from a gas flowing through a line, comprising a yarn filter made in accordance with the method of claim 2.

4. A process for removing particulate matter from a gas line comprising, inserting into the line a yarn filter made in accordance with claim 2, and passing the gas through the yarn filter.

5. A trap for removing particulate matter from a gas flowing through a line, comprising a yarn filter made in accordance with the method of claim 1.

6. A process for removing particulate matter from a gas line comprising, inserting into the line a yarn filter made in accordance with claim 1, and passing the gas through the yarn filter.

7. A trap for removing particulate matter from a flowing gas, comprising:
   a gas line with side walls forming a cavity;
   a resilient filter comprising a length of yarn of substantially continuous glass filaments which has been formed into a toroid having a closed center and sized to make contact with the side walls of the cavity, and
   means for retaining the filter in the cavity.

8. A gas regulator wherein the improvement comprises the trap of claim 7.

* * * * *